United States Patent [19]

Wendt

[11] 4,002,285
[45] Jan. 11, 1977

[54] METHOD OF METALLURGICALLY JOINING TUBING

[75] Inventor: Michael E. Wendt, Tyler, Tex.

[73] Assignee: General Electric Company, Louisville, Ky.

[22] Filed: Mar. 24, 1976

[21] Appl. No.: 670,062

[52] U.S. Cl. .......................................... 228/141 A
[51] Int. Cl.² ........................................ B23K 31/02
[58] Field of Search ........... 228/114, 115, 116, 153, 228/154, 183, 208, 242, 243, 234, 254, 141

[56] References Cited

UNITED STATES PATENTS

| | | | |
|---|---|---|---|
| 3,633,266 | 1/1972 | Taylor | 228/183 |
| 3,750,248 | 8/1973 | Morris | 228/154 |
| 3,937,383 | 2/1976 | Sawert | 228/115 |

FOREIGN PATENTS OR APPLICATIONS

| | | | |
|---|---|---|---|
| 667,143 | 10/1949 | United Kingdom | 228/154 |

Primary Examiner—Al Lawrence Smith
Assistant Examiner—Margaret Joyce
Attorney, Agent, or Firm—Frank P. Giacalone; Francis H. Boos

[57] ABSTRACT

The method of joining the contiguous surfaces of telescoped end portions of tube members wherein at least one of the surfaces to be joined is coated with a layer of solder. A heated forming means is applied to the telescoped end portion to reflow the solder while simultaneously applying sufficient pressure in a radial direction to progressively reduce the radial clearance between the end portions in an axial direction toward the open end of the female member. The temperature and pressure applied is sufficient to provide melted solder between the surfaces to be joined as the crimping action proceeds axially so that excess solder is forced hydraulically out of the open end of the female member as the radial clearance is progressively reduced to a minimum. The scrubbing action of the molten solder as it is forced progressively from the radial clearance is effective in removing the oxide from the surfaces to be joined thereby completing a joint between the members.

3 Claims, 4 Drawing Figures

METHOD OF METALLURGICALLY JOINING TUBING

BACKGROUND OF THE INVENTION

1. Field of the Invention

This invention relates generally to a method of joining telescoped metal tube members, and more specifically to coating at least one of the surfaces to be joined with a layer of solder before telescoping the members, and then simultaneously heating the members to reflow the solder while applying pressure radially and continuing to apply pressure progressively in an axial direction with a heated forming means such that an axial movement of solder from the joint area disperses an oxide layer and allows the solder to wet the uncoated surface and form a joint. In effect a fluxless joining is accomplished with the use of a heated crimping or forming means which is capable of progressively reducing the radial clearance between the surfaces to be joined to a minimum so that solder is forced hydraulically out of the radial clearance to effectively scrub oxide from the surfaces to be joined.

2. Description of the Prior Art

In joining aluminum surfaces or surfaces that are provided with a layer of solder, it is customary to remove the oxide coating from the surfaces to be joined so as to allow the joining alloy to wet the surface to be joined to provide a metallurgical joint. A common way of removing oxide from the surfaces to be joined is to employ a flux before or during the joining operation, however, fluxless joining has been found to be more advantageous.

Fluxless techniques are presently available which eliminate the oxide problem wherein the pretinned members to be joined are moved relative to each other at soldering temperatures to break up the oxide film and permit wetting by the solder. U.S. Pat. No. 3,633,266-Taylor discloses one such method of joining aluminum tube members by fluxless soldering. In the method disclosed in the Taylor patent at least one of the members to be joined is coated with solder. The members are dimensioned to provide an interference fit when telescoped so that when the members are heated to reflow the solder, engagement of the surfaces breaks up or disrupts the surfaces of the coating and the oxide film thereon to assure a bond between the tubes. While the above method may be effective in removing the oxide film and provide a satisfactory joint, the means employed to impart motion may of necessity be special high cost equipment. Further, to insure that when the members are moved relative to each other, the coating remains in contact, and rubs together to break up the surface oxide of the members, it is required that the members to be joined be fabricated within critical dimensions.

Another attempt at fluxless joining of aluminum surfaces is disclosed in U.S. Pat. No. 3,680,200-Terrill et al wherein tube ends are telescoped and a solder insert is positioned adjacent the area to be joined. The joint is heated and a multi-directional positive ultrasonic energy is applied to the joint site causing the molten joining alloy to cavitate thereby disrupting the oxide film and allowing the joining alloy to wet the surfaces to be joined. As pointed out in the Terrill patent, it is critical that the annular gap between male and female members ranges from 0.002 inches to 0.006 inches around substantially the entire periphery. Maintaining these critical gaps could add extra burdens in their manufacture.

Another technique employed in fluxless soldering is the ultrasonic dip soldering in which ultrasonic energy is used to disrupt the oxide film. U.S. Pat. No. 3,831,263-Dzierski discloses a dip or immersion soldering technique using an ultrasonically energized bath. The above technique requires that the total joint area be immersed in the solder bath which in some instances is difficult or impossible in a complex heat exchanger. It should be noted that relative to the present invention the ultrasonic dip soldering may be employed as the coating operation.

Canadian Pat. No. 671,383-Bouton discloses a method of tinning a body of aluminum wherein the aluminum is heated and the solid solder is drawn across the surface to melt the solder and wet the aluminum surface, while floating the oxide layer to the top of the molten body and stirring the solder so as to disperse the oxide layer.

Another attempt at joining aluminum surfaces is disclosed in U.S. Pat. No. 3,180,022-Briggs wherein at least one of the surfaces to be joined is coated with a bonding metal. The surfaces to be joined are brought into intimate contact and then heated at a temperature between the eutectic formation temperature and the melting point of the aluminum members, until the members are joined by diffusion of the formed eutectic away from the interface into the members.

SUMMARY OF THE INVENTION

By the present invention a method of joining tube members is provided wherein a first tube having an end portion is adapted to receive the end portion of a second tube with radial clearance between the contiguous surfaces to be joined. Prior to telescoping the end portion at least one of the surfaces to be joined is coated with a layer of solder. A heated forming means having a temperature sufficient to reflow the solder is applied to said telescoped members with sufficient pressure to initially crimp and reduce the radial clearance to a minimum thickness adjacent the open end of the second tube; and continuing to apply pressure in a manner that progressively reduces the radial clearance in an axial direction toward the open end of the first tube. Melted solder is provided between the surfaces to be joined as the crimping proceeds so that the excess solder is hydraulically forced out of the radial clearance with sufficient energy to cause the solder to scrub oxide from the surfaces to be joined and effect a joint therebetween.

It is an object of this invention to provide a joining method wherein oxide is removed from the surfaces to be joined by the scrubbing action of the solder as the excess solder is forced out of the joint area.

It is a further object of this invention to provide a fluxless method of joining telescoped male and female end portions of tube members having a film of solder on at least one of the surfaces to be joined by simultaneously heating and applying sufficient pressure to reduce the radial clearance between the members progressively in an axial direction toward the open end of the female member to hydraulically force the solder to scrub and break up an oxide film on the surfaces to be joined.

DESCRIPTION OF THE PREFERRED EMBODIMENT

Figure 1:
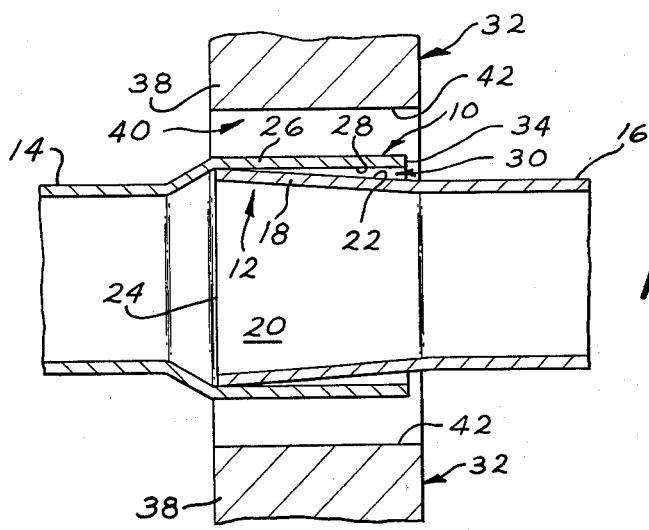
FIG. 1 is a sectional view showing the members to be joined by the method of the present invention.

By the present invention a method is provided for joining tube members and more specifically in making joints that may be adapted for use in the manufacture of heat exchangers employed in refrigeration systems. In carrying out the following method of the present invention, aluminum members were telescoped and joined together, however, it should be noted that the present method may be employed successfully with other metals used in refrigeration systems, such as copper, aluminum joints or any combination thereof.

When joining aluminum members it has been found that effective joints can be made when only one of the surfaces to be joined was pre-coated with solder. Further, when one of the members to be joined was copper, effective joints were made when the copper surface was the one precoated with solder.

The solder coating may be applied in any one of the various known manners, however, an ultrasonic bath wherein molten solder is subjected to ultrasonic agitation during the coating process has been used to effectively coat the surfaces to be joined with a layer of solder without the use of a flux.

Satisfactory joints have been realized when the thickness of the solder coating was between 0.0001 and 0.002 inches, and when its composition was normally 92–98% Zn and 2–8% Al. While satisfactory joints have been made with a coating of solder having a thickness and composition within the above parameters, it should be understood that solders having other compositions and thickness may be effectively employed and the exact solder composition and its relative thickness do not form a part of this invention.

As mentioned hereinbefore, an object of the present invention is to provide a method of joining the end portions of tube members wherein at least one has been first coated with a layer of solder and that does not require a specific step of removing the oxide layer from the surfaces to be joined. Further, the present method of joining surfaces may be carried out manually and at an effective speed that will conveniently permit its use in conjunction with an automated relatively high speed assembly operation. Accordingly, heating and crimping means is provided for simultaneously heating the surfaces to be joined at a temperature sufficient to reflow the solder coating while at the same time applying sufficient pressure to crimp the members in a manner that brings the surfaces to be joined together progressively in an axial direction to hydraulically force the excess solder out of the joint area, and to utilize the scrubbing action of the solder as it is forced out of the joint area to break up the oxide layer thereby forming an effective joint between the members.

It should be understood that in carrying out the present method of joining telescoped end portions of tube members it is necessary that the crimping action of the heated forming tool causes the solder to scrub the oxide from the surfaces to be joined by progressively forcing the solder from the joint area axially towards, and out of, the open end of the female tube member. The excess solder is forced out of the open end of the female member exterior of the joint, and accordingly the risk of a blocked internal passageway is minimized.

Figure 2:
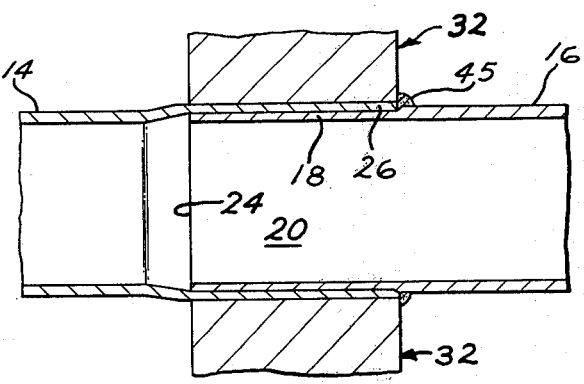
FIG. 2 is a sectional view showing the completed assembly.

While this action can be effectively carried out by any number of tube and forming means and tube configurations, the following are two that have been used successfully. FIGS. 1 and 2 disclose telescoped end portions wherein the male end portion is tapered outwardly relative to the axis of the tube members which causes the surfaces to be joined to engage progressively when contacted by a crimping surface that is substantially parallel to the axis of the tube members. The other configuration employed is disclosed in FIG. 3 wherein the forming means includes a crimping surface that is angled relative to the axis of the telescoped tube members so that it progressively forces the surfaces to be joined together.

Referring now to the drawings and more specifically to the embodiment of FIGS. 1 and 2, there are illustrated the end portions 10 and 12 of two tubes 14 and 16 respectively which are to be joined by the method of this invention. The wall section 18 of end portion 12 which is to form the inner or male portion of the completed joint area 20 as shown in FIG. 1, is angled relative to the axis of the tube 16. The wall section 18 including the contiguous surface 22 to be joined extends progressively radially outwardly from the tube 16 diameter at one end of the contiguous surface 22 axially to the open end 24 of tube 16. The wall section 26 of end portion 10 which is to form the outer or female portion of the completed joint area 20 including the contiguous surface 28 to be joined, is as shown in FIG. 1 substantially parallel to the axis of the tube 14.

The inside diameter (FIG. 1) of the enlarged end 10 is sized to receive the extreme or largest diameter adjacent the open end 24 of portion 12 with a radial clearance between surfaces to be joined 22, 28. This oversizing is dimensioned to provide a radial clearance 30 that allows for the convenient telescoping of the members and is not critical when employed in the present method of making joints. It should be noted that in carrying out the present invention it is not necessary to maintain an annular clearance between the telescoped end portions 10 and 12. It is, however, necessary that a radial clearance 30 be provided, and that it is progressively reduced axially by the heating and crimping means 32. As a result the present invention does not require the provision of means to center end portion 12 in bore 19. As will be explained fully hereinafter, the heating and crimping means 32 used in carrying out the present invention is dimensioned to bring and crimp the surfaces 22, 28 to be joined together progressively toward the open end 34 of the female tube member 10 to complete an effective joint.

In accordance with the method of the present invention, at least one of the surfaces 22, 28 of the wall sections 18, 26 to be joined are coated with a layer of solder in a manner hereinbefore described. With one of the surfaces to be joined coated with solder the next step in the method is to telescope the members 10 and 12 so as to place the contiguous surfaces 22, 28 in position to be joined as shown in the completed joint of FIG. 2.

The heated forming or crimping means 32 referred to above, and shown schematically in FIGS. 1-4, is then applied to the members 10 and 12 in a manner which will be explained in detail hereinafter. The forming means may be a manually operated hand held tool and may be heated by an external heat source or, an internally built in heating source. One external method of heating the forming means 32 is to expose it to a heating source tht automatically shuts off when a predetermined temperature is reached. Another method of heating may be to use an internal built in heating means or electrical resistor that is thermostatically controlled to maintain its temperature at a predetermined level.

It should be noted, however, that while the exact means employed to heat the crimping means 32 is not critical it is, however, necessary that the temperature of the heated crimping means 32 be sufficient to reflow the solder layer when applied to the telescoped end portion of members 14 and 16 and to maintain the solder in the radial clearance 30 in a molten state as it progressively brings together and crimps the surfaces 22 and 28 into engagement. This requirement necessitates that the forming means 32 be capable of raising, and maintaining the temperature of the end portions 10 and 12 above the melting point of the solder and below that of portions 10 and 12. In carrying out the present invention a temperature of between 800° and 1100° F was found effective.

The forming means 32 used in carrying out the present invention may include a pair of diametrically arranged members 38 having cavities or shaping sections 40 including crimping surfaces 42. In accordance with the embodiment of the invention shown in FIGS. 1 and 2, the crimping surface 42 being substantially parallel to the axis of the telescoped tube members. The telescoped end portions are positioned between the opposed semicircular concave surfaces 42 of the two diametrically opposed sections 38. The radius and configuration of the surfaces 42 being equal to the desired outer radius and configuration of the completed joint area.

The members 38 of the heated crimp means 32 are applied to the telescoped end portions from diametrically opposite sides in a direction perpendicular to the axis of the tube members with sufficient heat to reflow the solder and pressure to cause the progressive closing of the radial clearance 30 from end 24 of tube 16 axially toward open end 34 of tube 14.

The progressive radial crimping or compression of wall section 26 in a direction parallel with the axis of the tube members is effective in causing the progressive engagement of surface 28 with the angled surface 22 in the axial direction toward the open end 30 of tube member 14. Accordingly the excess solder is hydraulically forced out of the radial clearance with sufficient force to cause a scrubbing action on surfaces 22, 28 which breaks away the oxide layer from the surfaces and effects a leak-tight joint between the tube members.

Figure 3:
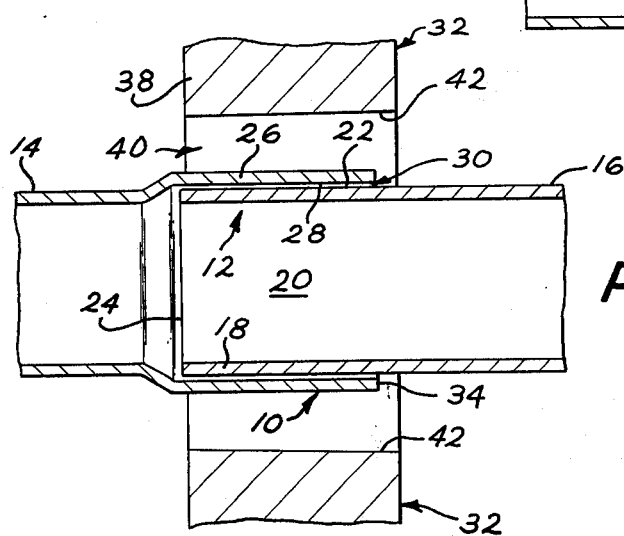
FIG. 3 is a sectional view of another embodiment of the invention showing members to be joined in accordance with the present method.
Figure 4:
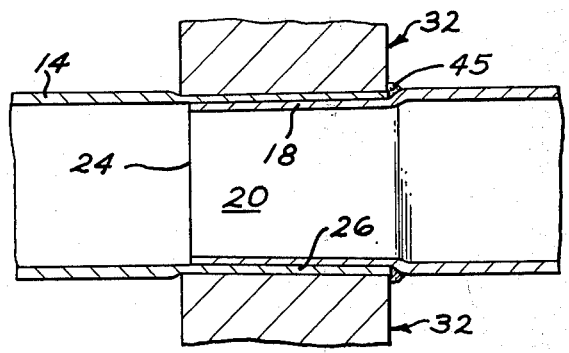
FIG. 4 is a sectional view showing the completed joint of FIG. 3.

Referring now to FIGS. 3 and 4, there is shown a second embodiment of the invention wherein parts identical to those of the embodiment of FIGS. 1 and 2 are shown by the same numerals.

In this embodiment both of the wall sections 18 and 26 are parallel to the axis of the tube members with the radial clearance 30 defined by the surfaces to be joined 22 and 28 being substantially uniform.

In this embodiment the crimping surface 42 is angled so as to engage the wall section 26 to initially melt the solder and crimp the surfaces 22 and 28 together in the area adjacent open end 24 of male tube 16. The continued forming action by the surface 42 causes the progressing engagement of the surfaces 22 and 28 to be joined to effect the same scrubbing action of the solder on the oxide as the embodiment of FIGS. 1 and 2.

The excess solder forced out of the joint area by the crimping action of the present invention tends to build up to form a bead or fillet 45 between the open end 34 of tube 14 and the outer wall of tube 16. When the tube members to be joined are of dissimilar material the bead 45 acts as a sacrificial material which in effect delays or eliminates the galvanic corrosion between the members.

The foregoing is a description of the preferred embodiment of the invention and variations may be made thereto without departing from the true spirit of the invention, as defined in the appended claims.

I claim:
1. The method of joining tube members comprising:
    providing a first tube having an end portion adapted to receive the end portion of a second tube with radial clearance between the contiguous surfaces to be joined;
    coating at least one of the surfaces to be joined with a layer of solder;
    telescoping the end portions so that the contiguous surfaces to be joined are oppositely disposed;
    applying a heated crimping means having a temperature sufficient to reflow the solder on said telescoped members; and simultaneously
    applying sufficient pressure radially with the heated crimping means to initially crimp and reduce said radial clearance to a minimum thickness adjacent the open end of the second tube; and continuing to apply radial pressure in a manner that progressively reduces said radial clearance in an axial direction toward the open end of the first tube while providing melted solder between the surfaces to be joined as said crimping proceeds to hydraulically force the solder out of the radial clearance with sufficient energy to cause the solder to scrub oxide from the surfaces to be joined and effect a joint therebetween.

2. The method according to claim 1 wherein the wall portion of one of said end portions is parallel to the axis of the tube member while the wall portion of the other of said end portions is angled relative to the axis of the tube to provide a radial clearance that progressively increases toward the open end of said first tube so that pressure applied perpendicular to said axis by said heated crimping means is effective in progressively crimping the surfaces to be joined toward said open end.

3. The method according to claim 1 wherein the wall portions of both of said end portions being parallel to the axis of said tube members, and said heated forming means including an angled crimping surface that is effective in progressively crimping the surfaces to be joined toward said open end.

* * * * *